US 8,653,824 B1
Date of Patent: Feb. 18, 2014

(12) United States Patent
Liu et al.

(54) DELTA TEMPERATURE TEST METHOD AND SYSTEM

(75) Inventors: Feng Liu, San Ramon, CA (US); Mehran Zargari, Campbell, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 991 days.

(21) Appl. No.: 12/639,896

(22) Filed: Dec. 16, 2009

(51) Int. Cl.
*G01R 31/08* (2006.01)

(52) U.S. Cl.
USPC .......... 324/522; 324/750.03; 324/750.06; 324/228; 324/262; 324/210; 324/211; 324/212; 324/202; 324/235; 324/234; 324/232; 324/252; 369/52.1; 369/53.1; 73/856; 365/201; 360/324.1; 360/324.2; 360/31; 360/59; 360/55; 360/234.3; 360/75; 360/125.74; 360/125.75

(58) Field of Classification Search
USPC .......... 324/522, 750.03, 750.06, 228, 262, 324/210–212, 202, 235, 234, 232, 252; 360/324.1, 324.2, 31, 59, 55, 234.3, 360/75, 125.74, 125.75; 369/52.1, 53.1; 73/856; 365/201
See application file for complete search history.

(56) References Cited

U.S. PATENT DOCUMENTS

| | | | |
|---|---|---|---|
| 3,302,095 A * | 1/1967 | Bell et al. .......... | 363/121 |
| 3,623,859 A * | 11/1971 | Aldridge .......... | 75/343 |
| 5,514,953 A | 5/1996 | Schultz et al. | |
| 5,517,111 A | 5/1996 | Shelor | |
| 5,721,488 A | 2/1998 | Sakai et al. | |
| 5,821,746 A | 10/1998 | Shelor | |
| 5,919,581 A * | 7/1999 | Yamamoto et al. .......... | 428/836.2 |
| 5,926,019 A | 7/1999 | Okumura | |
| 5,998,993 A | 12/1999 | Inage et al. | |
| 6,081,394 A * | 6/2000 | Tsuboi .......... | 360/25 |
| 6,111,406 A | 8/2000 | Garfunkel et al. | |
| 6,346,809 B1 | 2/2002 | Karam, II | |
| 6,479,988 B2 | 11/2002 | Hachisuka et al. | |
| 6,696,831 B2 | 2/2004 | Nozu | |
| 7,075,294 B2 | 7/2006 | Matsukuma et al. | |
| 7,138,797 B2 | 11/2006 | Fox et al. | |
| 7,165,462 B2 | 1/2007 | Luo et al. | |
| 7,193,824 B2 | 3/2007 | Naka | |
| 7,288,935 B2 | 10/2007 | Farren et al. | |
| 7,302,357 B2 * | 11/2007 | Ausserlechner et al. ..... | 702/107 |
| 7,317,597 B2 | 1/2008 | Naka | |
| 7,365,531 B2 | 4/2008 | Che et al. | |
| 8,116,043 B2 * | 2/2012 | Leng et al. .......... | 360/324.11 |
| 8,194,366 B1 * | 6/2012 | Li et al. .......... | 360/324.2 |
| 8,227,023 B1 * | 7/2012 | Liu et al. .......... | 427/127 |
| 2001/0048303 A1 | 12/2001 | Hachisuka et al. .......... | 324/210 |
| 2002/0114092 A1 * | 8/2002 | Yang .......... | 360/31 |
| 2002/0167750 A1 * | 11/2002 | Kurihara .......... | 360/69 |
| 2003/0038626 A1 | 2/2003 | Carrington et al. | |
| 2003/0178991 A1 * | 9/2003 | Jang et al. .......... | 324/210 |

(Continued)

*Primary Examiner* — Patrick J Assouad
*Assistant Examiner* — Lamarr Brown

(57) ABSTRACT

A method for quasi-static testing a magnetic recording head read sensor is described. The method includes applying a first voltage to a heater in the magnetic recording head and measuring an output of the magnetic recording head read sensor while applying the first voltage to the heater and recording the measured output as a first set of measurements. The method further includes applying a second voltage to the heater in the magnetic recording head and measuring the output of the magnetic recording head read sensor while applying the second voltage to the heater and recording the measured output as a second set of measurements. The first and second sets of measurements are then compared.

32 Claims, 2 Drawing Sheets

(56) References Cited

U.S. PATENT DOCUMENTS

| | | | |
|---|---|---|---|
| 2004/0075931 A1* | 4/2004 | Kim et al. | 360/66 |
| 2004/0078703 A1* | 4/2004 | Takahashi et al. | 714/42 |
| 2005/0089722 A1* | 4/2005 | Masaki | 428/694 BH |
| 2006/0001995 A1* | 1/2006 | Matsumoto | 360/31 |
| 2006/0002001 A1* | 1/2006 | Fong et al. | 360/75 |
| 2006/0023331 A1* | 2/2006 | Flechsig et al. | 360/61 |
| 2006/0077813 A1* | 4/2006 | Chuang et al. | 369/47.1 |
| 2006/0087318 A1* | 4/2006 | Crolly et al. | 324/252 |
| 2006/0221508 A1 | 10/2006 | Iwase | |
| 2007/0041114 A1* | 2/2007 | Takahashi | 360/31 |
| 2007/0064336 A1* | 3/2007 | Hirasaka et al. | 360/77.13 |
| 2007/0096725 A1* | 5/2007 | Inomata | 324/210 |
| 2007/0115580 A1* | 5/2007 | Moriya et al. | 360/77.08 |
| 2007/0236834 A1* | 10/2007 | Toma et al. | 360/126 |
| 2008/0170321 A1* | 7/2008 | Shimozato | 360/75 |
| 2008/0225427 A1* | 9/2008 | Liu | 360/75 |
| 2008/0247073 A1* | 10/2008 | Park | 360/59 |
| 2009/0128947 A1* | 5/2009 | Kermiche et al. | 360/75 |
| 2009/0190245 A1* | 7/2009 | Nakata | 360/31 |
| 2009/0195912 A1* | 8/2009 | Sato | 360/75 |
| 2009/0237830 A1* | 9/2009 | Shibasaki | 360/75 |
| 2009/0268330 A1* | 10/2009 | Lee et al. | 360/31 |
| 2010/0027156 A1* | 2/2010 | Izumi | 360/75 |
| 2010/0067135 A1* | 3/2010 | Makuuchi et al. | 360/31 |
| 2010/0123963 A1* | 5/2010 | Shibasaki | 360/31 |
| 2010/0157455 A1* | 6/2010 | Watanabe | 360/31 |
| 2010/0254038 A1* | 10/2010 | Kim | 360/75 |
| 2010/0321810 A1* | 12/2010 | Ueda et al. | 360/31 |
| 2011/0013310 A1* | 1/2011 | Sugimoto et al. | 360/75 |
| 2011/0069410 A1* | 3/2011 | Kashiwase et al. | 360/75 |
| 2011/0128827 A1* | 6/2011 | Shimazawa et al. | 369/13.02 |
| 2011/0135961 A1* | 6/2011 | Leng et al. | 428/811.2 |

* cited by examiner

DELTA TEMPERATURE TEST METHOD AND SYSTEM

FIELD

The present disclosure generally concerns the testing of hard disk drive components and, more particularly, the quasi-static testing of magnetic recording heads.

BACKGROUND

Hard disk drive reliability refers to the stable performance of a hard drive during the drive's operating lifetime after the drive has successfully passed a series of component and drive manufacturing and qualification tests. One fundamental failure mode in drive reliability is the degradation of the magnetic recording head read sensor stability as the disk drive operates. This degradation may be caused by stress, such as thermal or magnetic field stress, experienced by the read sensor during drive operation. Thermal stress may be from the internal temperature of the disk drive, operation of a dynamic flying height heater in the magnetic recording head, read sensor self-heating due to bias voltage, writer eddy current heating, thermal asperity, etc. Magnetic field stress may be from media perpendicular recording transitions, such as in servo regions, stray fields or magnetic fields from operation of a dynamic flying height heater directly or indirectly acting on the read sensor.

Instability in a magnetic recording head read sensor generally shows up as baseline popping due to magnetic film defects or abnormal asymmetry excursions due to hard bias distortions. Magnetic recording heads that ultimately fail due to these conditions generally pass normal component and drive production test methodologies. Accordingly, magnetic recording heads that may be potential reliability failures are difficult to screen out prior to being assembled into a disk drive for shipment.

SUMMARY

The subject technology utilizes a delta temperature test methodology to test magnetic recording head read sensors at the component level to screen out potential reliability failures. Specifically, the test methodology incorporates thermal and magnetic field stress while testing magnetic recording head read sensors at the component bar level of testing to screen out potential reliability failures.

According to one aspect of the present disclosure, a method for quasi-static testing a magnetic recording head read sensor is described. The method includes applying a first voltage to a heater in the magnetic recording head and measuring an output of the magnetic recording head read sensor while applying the first voltage to the heater and recording the measured output as a first set of measurements. The method further includes applying a second voltage to the heater in the magnetic recording head and measuring the output of the magnetic recording head read sensor while applying the second voltage to the heater and recording the measured output as a second set of measurements. The first and second sets of measurements are then compared.

According to another aspect of the present disclosure, an apparatus for quasi-static testing a magnetic recording head read sensor is described. The apparatus includes a power source for applying a voltage to a heater in the magnetic recording head and a meter for measuring an output of the magnetic recording head read sensor. A test controller is configured to apply a first voltage to the heater using the power source and measure the output of the magnetic recording head read sensor while applying the first voltage to the heater using the meter and record the measured output as a first set of measurements. The test controller is further configured to apply a second voltage to the heater using the power source and measure the output of the magnetic recording head read sensor while applying the second voltage to the heater using the meter and record the measured output as a second set of measurements.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
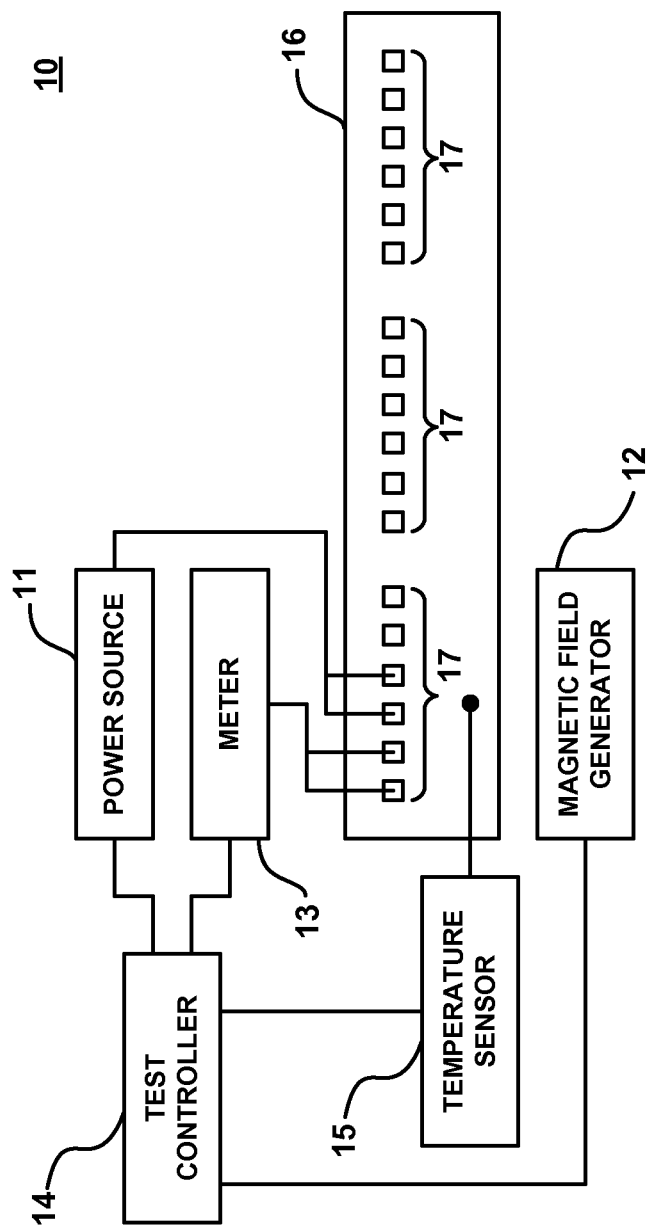
FIG. 1 is a block diagram depicting components of a quasi-static test system according to one aspect of the subject technology.

FIG. 1 is a block diagram of test system 10 according to one aspect of the subject technology. Test system 10 includes power source 11, magnetic field generator 12, meter 13, test controller 14 and temperature sensor 15. Briefly, power source 11 is configured to apply a voltage to a heater in a magnetic recording head and magnetic field generator 12 is configured to apply a magnetic field to the magnetic recording head. Meter 13 measures an output of the magnetic recording head read sensor as voltages are applied to the heater by power source 11 and magnetic fields are applied to the magnetic recording head by magnetic field generator 12. Test controller 14 is configured to control power source 11 and magnetic field generator 12 as well as to record the output of meter 13 during execution of the test methodology described in more detail below. Temperature sensor 15 detects the magnetic recording head's temperature, which may be used by test controller 14 for calibration of test system 10.

Also represented in FIG. 1 are three magnetic recording heads, such as a Current Perpendicular to the Plane (CPP) Tunnel Magnetoresistance (TMR) magnetic recording head, arranged in bar 16. Each of the three magnetic recording heads is represented by a set of six contact pads 17 used to electrically connect to different components within the magnetic recording head. As depicted in FIG. 1, meter 13 is electrically connected to two of the contact pads corresponding to a read sensor in the magnetic recording head. Power source 11 is electrically connected to two of the contact pads corresponding to a heater, such as a dynamic flying height (DFH) heater in the magnetic recording head. The two remaining contact pads are used to electrically connect to a writer in the magnetic recording head, which is not required for the subject test methodology.

While bar 16 is depicted in FIG. 1 as having three magnetic recording heads arranged therein, those skilled in the art will recognize that the subject technology may be applied to test magnetic recording heads arranged in a bar having more or less than three magnetic recording heads. Those skilled in the art will further recognize that the subject technology may be applied to test other types of magnetic recording heads beyond CPP TMR magnetic recording heads. In addition, those skilled in the art will recognize that the magnetic recording heads arranged in a bar being tested according to the subject technology may have more than six contact pads for electrically connecting to components within each of the respective magnetic recording heads.

As indicated above, power source 11 is configured to apply a voltage to the heater in the magnetic recording head. Power source 11 represents any type of power source capable of selectively applying a voltage to an external device. The voltage level applied by power source 11 is selected according to the test methodology described in further detail below. The voltage level may be selected by test controller 14 using control signals communicated between power source 11 and test controller 14. Alternatively, the voltage level may be selected manually by a test operator using controls on power source 11.

As further indicated above, magnetic field generator 12 is configured to apply a magnetic field to the magnetic recording head being tested. Magnetic field generator 12 represents any type of magnetic field generator capable of selectively generating a magnetic field. For example, magnetic field generator 12 may generate a normal transverse magnetic field sweep which allows transfer curves to be measured and recorded from the output of the magnetic recording head read sensor. The magnetic field generated by magnetic field generator 12 may be controlled by test controller 14 using control signals communicated between magnetic field generator 12 and test controller 14. Alternatively, the magnetic field generated may be controlled manually by a test operator using controls on magnetic field generator 12.

As further indicated above, meter 13 is configured to measure an output of a magnetic recording head read sensor as voltages are applied to the read sensor by power source 11 and magnetic fields are applied to the magnetic recording head by magnetic field generator 12. Meter 13 represents any type of meter capable of measuring a voltage across the read sensor of the magnetic recording head and/or a current flowing through the read sensor of the magnetic recording head. Meter 13 may measure outputs of the magnetic recording head read sensor in the time domain and/or the frequency domain. The measured values may be recorded in meter 13 and subsequently transferred to test controller 14 for evaluation purposes, or test controller 14 may read and record the measured values directly from meter 13 using signals communicated between meter 13 and test controller 14.

As further indicated above, temperature sensor 15 is configured to detect the temperature of the magnetic recording head being tested by test system 10. Temperature sensor 15 represents any type of temperature sensor capable of sensing the temperature of a magnetic recording head within bar 16. For example, temperature sensor 15 may include an ex-situ thermal couple or an in-situ temperature sensing device formed as part of bar 16. Temperature sensor 15 may record the detected temperature of the magnetic recording head and transfer the recorded data to test controller 14 using signals communicated between temperature sensor 15 and test controller 14. Alternatively, test controller 14 may receive and record electrical signals representing the detected temperature communicated between temperature sensor 15 and test controller 14. Temperature sensor 15 also may include a display interface for a test operator to control the operation of temperature sensor 15 and read the temperature of the magnetic recording head detected by temperature sensor 15.

Test controller 14 represents a computing system configured to control and record the execution of the test methodology of the subject technology. Test controller 14 may include one or more processors configured to execute one or more sequences of instructions to implement the test methodology described in further detail below. The one or more sequences of instructions may be stored in computer/machine readable media from which the processor retrieves the instructions for execution. The processor also may store data generated during the execution of the instructions in the computer/machine readable media. For example, the processor may store the output of meter 13 in the computer/machine readable media as magnetic field generator 12 applies a magnetic field to a magnetic recording head being tested and/or power source 11 applies a voltage to a heater within the magnetic recording head. Other data, such as test parameters and results from previous testing cycles, also may be stored in the computer/machine readable media.

The computer/machine readable media of test controller 14 may be any of a number of different types of media. The media may include magnetic media such as a hard disk, a floppy disk, magnetic tape, etc. The media may include optical media such as CD-ROM, DVD, etc. The media also may include electronic media such as random access memory (RAM), flash memory, etc. The computer/machine readable media is not limited to any single type of media and may include combinations of different types of media. For example, the instructions may be stored in a non-volatile type of media, such as on a hard disk. The processor may transfer sequences of instructions to a faster, volatile type of media, such as DRAM or SRAM, prior to execution of the instructions.

Test controller 14 may include one or more ports for connecting to and communicating with other components of test system 10, such as power source 11, magnetic field generator 12, meter 13 and temperature sensor 15. The ports may be conventional serial ports or parallel ports (e.g., USB, RS-232, etc.). The ports may be proprietary to the particular component being connected to test controller 14. The ports also may be networking ports. In addition to ports that rely on a physical media to communicate signals between components, test controller 14 may rely on wireless communication protocols to communicate with other components in test system 10. Test controller 14 may use 802.11x, Bluetooth, IR, etc. to communicate with other components in test system 10.

While FIG. 1 depicts a single test controller 14, the subject technology is not limited to the use of a single test controller 14. For example, each of power source 11, magnetic field generator 12, meter 13 and temperature sensor 15 may be controlled by a respective controller. Alternatively, some of the components of test system 10 may be controlled by a single controller while other components are controlled by individual respective controllers.

Figure 2:
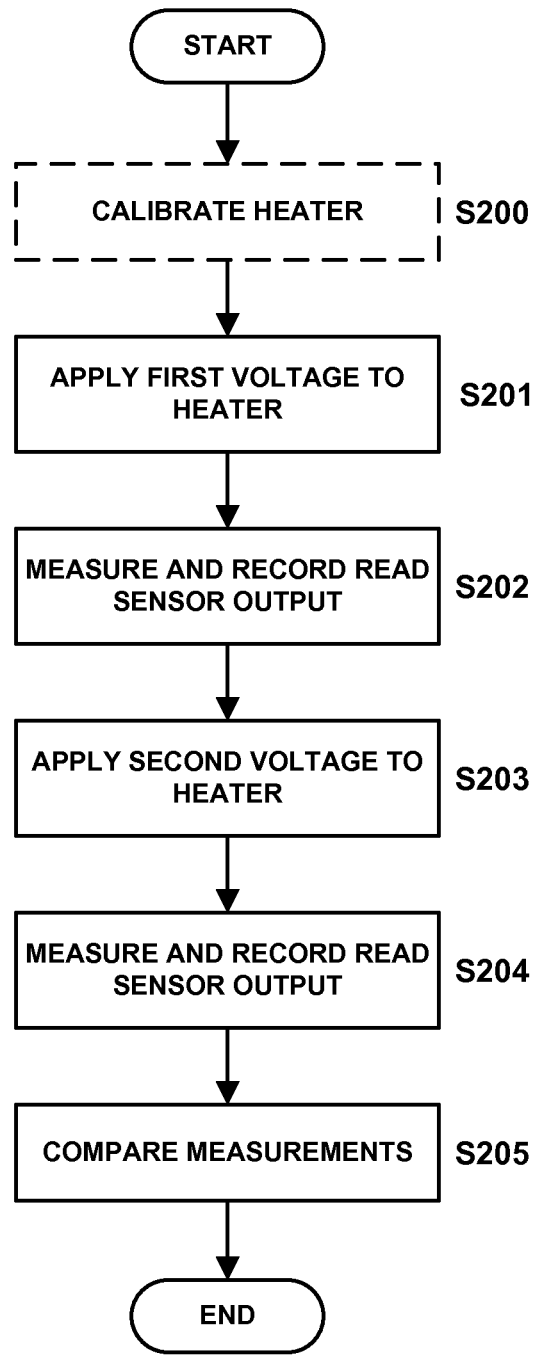
FIG. 2 is a flowchart illustrating a method for quasi-static testing a magnetic recording head read sensor according to one aspect of the subject technology.

FIG. 2 is a flowchart illustrating a method for quasi-static testing a magnetic recording head read sensor according to one aspect of the subject technology. Briefly, the method may include the steps of calibrating the heater in a magnetic recording head (S200), applying a first voltage to the heater (S201), measuring and recording the output of a read sensor in the magnetic recording head while applying the first voltage to the heater (S202), applying a second voltage to the heater (S203), measuring and recording the output of the read sensor while applying the second voltage (S204), and comparing the measurements (S205). Each of these steps will be described in further detail below.

Prior to executing the steps illustrated in FIG. 2, a bar containing one or more magnetic recording heads is mounted in test system 10. Mounting the bar includes securing the bar on a test bed to hold the bar in position during testing. As indicated above, power source 11 is connected to contact pads on the bar corresponding to a heater (e.g., DFH) within the magnetic recording head being tested. Connecting power source 11 to the contact pads may include positioning probes coupled to power source 11 over and in contact with the contact pads for the heater. Meter 13 also is connected to the magnetic recording head being tested. As indicated above, meter 13 is connected to contact pads on the bar corresponding to the read sensor in the magnetic recording heads. Connecting meter 13 to the contact pads may include positioning probes coupled to meter 13 over and in contact with the contact pads for the read sensor.

The method illustrated in FIG. 2 is started when test controller 14 retrieves and begins executing one or more sequences of instructions to control test system 10 according to the test methodology described herein. This action by test controller 14 may be initiated by a test operator via a user interface coupled to test controller 14. The method illustrated in FIG. 2 continues through the steps until the test has completed or a test operator interrupts the test via the user interface.

As mentioned above, thermal stress may cause instability in a magnetic recording head read sensor. The test methodology of the subject technology heats the magnetic recording head being tested to a temperature comparable with the ambient temperature during drive operation (e.g., 100°-125° Celsius) and/or a temperature within the range of temperatures the magnetic recording head may be subjected to in a volume production environment (e.g., 50°-200° Celsius). Rather than placing the bar containing the magnetic recording head being tested, as well as some or all of the components of test system 10, within a heated environment, the subject technology uses the DFH within the magnetic recording head to heat the magnetic recording head to the desired predetermined temperature. By applying a specific voltage to the DFH for a period of time, the magnetic recording head can be heated to the desired temperature.

In step S200, the DFH in the magnetic recording head is calibrated. Calibration of the DFH involves determining the voltage level and period of time needed to heat the magnetic recording head to the desired predetermined temperature. Calibration is performed by adjusting the voltage applied to the heater by power source 11 and monitoring the temperature of the magnetic recording head using temperature sensor 15. Calibration may be performed manually by a test operator operating power source 11 manually and reading a displayed temperature on temperature sensor 15. Alternatively, test controller 14 may execute a sequence of instructions to perform an automatic calibration of the heater by varying the voltage applied by power source 11 and monitoring the detected temperature reported by temperature sensor 15.

Calibration of the heater may be performed for each magnetic recording head being tested. Alternatively, calibration may be performed for the heater in the first magnetic recording head tested within a particular bar. The determined voltage value to be applied to the heater may be saved within test controller 14 and then used when testing any other magnetic recording heads within the particular bar. Additionally, calibration may be performed for the heater in the first magnetic recording head tested for a production batch. The determined voltage value to be applied to the heater may be saved within test controller 14 and then used when testing any other magnetic recording heads with that particular production batch. Those skilled in the art will recognize that calibration does not need be performed for each magnetic recording head being tested and that a determined voltage value to be applied to the heater of a magnetic recording head may be used for other magnetic recording heads from a common bar, batch, design, etc.

In step S201, a first voltage is applied by power source 11 to the heater in the magnetic recording head to heat the magnetic recording head to a first temperature. According to one aspect of the subject technology, the first temperature may be the ambient temperature of the test environment. In this aspect, the first voltage may be 0 volts in order to provide no additional heat to the magnetic recording head other than that provided by the test environment and the normal operation of the test equipment.

In step S202, the output of the read sensor in the magnetic recording head is measured by meter 13 and recorded by test controller 14 as a first set of measurements. This measurement and recording is performed while the first voltage is applied to the heater in the magnetic recording head. During this measurement and recording step, a magnetic field may be applied to the magnetic recording head by magnetic field generator 12. For example, magnetic field generator 12 may apply a normal transverse magnetic field sweep to the magnetic recording head in order to generate a transfer curve from the output of the read sensor measured by meter 13 and recorded by test controller 14.

Steps S201 and S202 may be repeated multiple times to generate multiple sets of measurements for evaluation of the stability of the magnetic recording head read sensor. For example, steps S201 and S202 may be repeated ten times prior to proceeding with the next portion of the test methodology.

In step S203, a second voltage is applied to the heater of the magnetic recording head by power source 11. The second voltage is the voltage determined during calibration to cause the temperature of the magnetic recording head to reach the predetermined temperature corresponding to the second voltage determined during calibration in step S200. As noted above, the predetermined temperature may be within a range of temperatures between 50° and 200° Celsius. The predetermined temperature may be selected based on the goals of the test methodology being applied. For example, the predetermined temperature may be set at 200° Celsius, or a narrow range surrounding this temperature, for a test methodology designed to subject the magnetic recording head to conditions expected in a volume production environment. Alternatively, the predetermined temperature may be set at 125° Celsius, or a narrow range surrounding this temperature, for a test methodology designed to subject the magnetic recording head to conditions expected during normal hard drive operation.

In step S204, the output of the magnetic recording head read sensor is measured by meter 13 and recorded by test controller 14 as a second set of measurements. During step S204, the magnetic field applied to the magnetic recording head by magnetic field generator 12 may be applied again to the magnetic recording head. For example, the previously applied normal transverse magnetic field sweep may be applied by magnetic field generator 12 in order to generate a transfer curve from the output of the read sensor measured by meter 13 and recorded by test controller 14.

As with steps S201 and S202, steps S203 and S204 may be repeated multiple times to generate multiple sets of measurements for evaluation of the stability of the magnetic recording head read sensor. For example, steps S203 and S204 may be repeated ten times prior to proceeding to the next portion of the test methodology.

In step S205, the first and second sets of measurements are compared and evaluated to identify magnetic recording heads having potential reliability issues. During the testing described above, the magnetic recording head is subjected to conditions similar to those experienced during operation of a hard drive or in volume production environment. Those magnetic recording heads whose performance, represented by the second set of measurements, at the elevated predetermined temperature deviates from the performance, represented by the first set of measurements, at the ambient testing temperature are identified as potential reliability failures. The extent of the deviation necessary to identify a magnetic recording sensor as a potential reliability failure may vary depending on the intended lifespan and design parameters of the hard drive. For example, the transfer curves derived using the sets of measurements may be compared and any deviation of the transfer curve properties corresponding to the elevated temperature that exceeds a threshold of 10%, for example, from the transfer curve properties corresponding to the ambient temperature may cause the magnetic recording head to be labeled as a potential reliability failure. Alternatively, the threshold used for comparison purposes may be a value, or range of values, representing a difference in the measurements rather than a percentage change between the measurements. The magnitude of the value, or range of values, may vary depending on the properties being compared between the two sets of measurements.

A number of different transfer curve properties may be used to evaluate the magnetic recording heads for potential reliability issues. For example, a comparison may be made on head noise performance, such as noise amplitude in the time domain and/or the frequency domain. Other properties include, but are not limited to, head amplitude performance, transfer curve linearity and/or asymmetry performance, and head resistance performance. The comparison and evaluation may be made using any of the properties individually or any combination thereof. Those skilled in the art will recognize that acceptable values, or ranges of values, for these properties may be defined in a test specification developed to define performance expectations for a particular batch or design of magnetic recording heads.

If steps S201 and S202 are repeated multiple times, the respective sets of measurements may be averaged to obtain an averaged first set of measurements, or each set of measurements may be used in the comparison step. Similarly, if steps S203 and S204 are repeated multiple times, the respective sets of measurements may be averaged to obtain an averaged second set of measurements, or each set of measurements may be used in the comparison step. Each magnetic recording head arranged in the same bar or part of the same batch of the labeled magnetic recording head also may be labeled as a potential reliability failure.

The comparison of sets of measurements described above compares the second set of measurements against the first set of measurements to identify potential reliability failures. According to another aspect of the subject technology, one or both of the sets of measurements may be compared individually against values or ranges of values in a defined test specification and magnetic recording heads having one or both sets of measurements that do not fall within the values or ranges of values in the defined test specification are labeled as potential reliability failures.

The test methodology described above provides significant advantages within the testing and assembly process for hard disk drives. The elevated temperature and applied magnetic field are intended to mimic conditions experienced during operation of a disk drive and may accelerate failure modes that may not otherwise occur until after the magnetic recording head is assembled in a finished disk drive and during disk drive operation. By developing a test methodology that can be applied at the bar level of component testing, potential reliability failures can be identified earlier in the assembly/manufacturing process and removed from the assembly/manufacturing process. Furthermore, applying the subject test methodology allows different magnetic recording head designs and/or manufacturing processes to be evaluated and compared without requiring the magnetic recording heads to be assembled in a finished disk drive prior to testing and evaluation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for quasi-static testing a magnetic recording head read sensor, the method comprising:
   applying a first voltage to a heater in the magnetic recording head;
   measuring an output of the magnetic recording head read sensor while applying the first voltage to the heater and recording the measured output as a first set of measurements;
   applying a second voltage to the heater in the magnetic recording head;
   measuring the output of the magnetic recording head read sensor while applying the second voltage to the heater and recording the measured output as a second set of measurements; and
   comparing the first and second sets of measurements.

2. The method according to claim 1, wherein the first voltage is 0 volts and the second voltage corresponds to a predetermined temperature of the heater in the magnetic recording head.

3. The method according to claim 2, wherein the predetermined temperature is between 50° and 200° Celsius.

4. The method according to claim 2, further comprising calibrating the heater in the magnetic recording head to determine the second voltage corresponding to the predetermined temperature.

5. The method according to claim 1, wherein the heater comprises a dynamic flying height heater.

6. The method according to claim 1, wherein the magnetic recording head is arranged in a bar comprising a plurality of magnetic recording heads.

7. The method according to claim 1, further comprising repeating the steps of applying the first voltage to the heater in the magnetic recording head and measuring the output of the magnetic recording head read sensor while applying the first voltage to the heater,
   wherein the output of the magnetic recording head read sensor measured during each repetition is recorded as a respective set of a plurality of sets of measurements.

8. The method according to claim 1, further comprising applying a magnetic field to the magnetic recording head while applying the first and second voltages to the heater,
   wherein the output of the magnetic recording head read sensor is measured while applying the magnetic field.

9. The method according to claim 8, wherein the magnetic field is cycled through a predetermined range of values.

10. The method according to claim 1, wherein comparing the first and second sets of measurements comprising determining a difference between the first and second sets of measurements, and
    wherein the magnetic recording head read sensor is determined to be potential reliability failure if the difference exceeds a threshold.

11. The method according to claim 1, wherein the measured output of the magnetic recording head read sensor comprises a voltage.

12. An apparatus for quasi-static testing a magnetic recording head read sensor, comprising:
    a power source for applying a voltage to a heater in the magnetic recording head;
    a meter for measuring an output of the magnetic recording head read sensor; and
    a test controller configured to:
        apply a first voltage to the heater using the power source;
        measure the output of the magnetic recording head read sensor while applying the first voltage to the heater using the meter and record the measured output as a first set of measurements;
        apply a second voltage to the heater using the power source; and
        measure the output of the magnetic recording head read sensor while applying the second voltage to the heater using the meter and record the measured output as a second set of measurements.

13. The apparatus according to claim 12, wherein the first voltage is 0 volts and the second voltage corresponds to a predetermined temperature of the heater in the magnetic recording head.

14. The apparatus according to claim 13, wherein the predetermined temperature is between 50° and 200° Celsius.

15. The apparatus according to claim 13, further comprising a temperature sensor for detecting a temperature of the magnetic recording head,
    wherein the test controller is further configured to calibrate the heater in the magnetic recording head using the temperature sensor and the power source to determine the second voltage corresponding to the predetermined temperature.

16. The apparatus according to claim 12, wherein the heater comprises a dynamic flying height heater.

17. The apparatus according to claim 12, wherein the magnetic recording head is in a bar comprising a plurality of magnetic recording heads.

18. The apparatus according to claim 12, wherein the test controller is further configured to repeat the steps of applying the first voltage to the heater in the magnetic recording head and measuring the output of the magnetic recording head read sensor while applying the first voltage to the heater,
    wherein the test controller is configured to record the output of the magnetic recording head read sensor measured during each repetition as a respective set of a plurality of sets of measurements.

19. The apparatus according to claim 12, further comprising:
    a magnetic field generator,
    wherein the test controller is further configured to apply a magnetic field to the magnetic recording head using the magnetic field generator while applying the first and second voltages to the heater using the power source, and
    wherein the output of the magnetic recording head read sensor is measured and recorded while applying the magnetic field.

20. The apparatus according to claim 19, wherein test controller is further configured to control the magnetic field generator to cycle the magnetic field through a predetermined range of values.

21. The apparatus according to claim 12, wherein the test controller is further configured to compare the first and second sets of measurements to determine a difference between the first and second set of measurements,
    wherein the magnetic recording head read sensor is determined to be a potential reliability failure if the difference exceeds a threshold.

22. The apparatus according to claim 12, wherein the measured output of the magnetic recording head read sensor comprises a voltage.

23. The apparatus according to claim 12, further comprising:
a magnetic field generator,
wherein the test controller is configured to apply a transverse magnetic field sweep to the magnetic recording head read sensor using the magnetic field generator while applying the first and second voltages to the heater using the power source, and
wherein the output of the magnetic recording head read sensor is measured and recorded while applying the transverse magnetic field sweep.

24. The apparatus according to claim 12:
wherein the second voltage corresponds to an ambient temperature of a hard drive containing the magnetic recording head read sensor during a preselected operation selected from the group consisting of a normal operation and a volume production environment operation.

25. The apparatus according to claim 12:
wherein the first voltage corresponds to an ambient temperature of a test environment for the quasi-static testing; and
wherein the second voltage corresponds to an ambient temperature of a hard drive containing the magnetic recording head read sensor during a preselected operation selected from the group consisting of a normal operation and a volume production environment operation.

26. The apparatus according to claim 12:
wherein the test controller is further configured to compare the first and second sets of measurements; and
wherein the first and second sets of measurements comprise a preselected characteristic of the magnetic recording head read sensor, the preselected characteristic selected from the group comprising a head amplitude performance, a head noise performance, a transfer curve linearity, an asymmetric performance, and combinations thereof.

27. The apparatus according to claim 12, further comprising a temperature sensor for detecting a temperature of the magnetic recording head read sensor,
wherein the test controller is configured to calibrate the heater in the magnetic recording head read sensor using the temperature sensor and the power source to determine the second voltage corresponding to a predetermined temperature; and
wherein the test controller is configured to adjust a voltage applied to the heater using the power source while measuring a temperature of the magnetic recording head using the temperature sensor.

28. The method according to claim 1, further comprising applying a transverse magnetic field sweep to the magnetic recording head read sensor while applying the first and second voltages to the heater,
wherein the output of the magnetic recording head read sensor is measured while applying the transverse magnetic field sweep.

29. The method according to claim 1:
wherein the second voltage corresponds to an ambient temperature of a hard drive containing the magnetic recording head read sensor during a preselected operation selected from the group consisting of a normal operation and a volume production environment operation.

30. The method according to claim 1:
wherein the first voltage corresponds to an ambient temperature of a test environment for the quasi-static testing; and
wherein the second voltage corresponds to an ambient temperature of a hard drive containing the magnetic recording head read sensor during a preselected operation selected from the group consisting of a normal operation and a volume production environment operation.

31. The method according to claim 1:
wherein the comparing the first and second sets of measurements comprises comparing a preselected characteristic of the magnetic recording head read sensor, the preselected characteristic selected from the group comprising a head amplitude performance, a head noise performance, a transfer curve linearity, an asymmetric performance, and combinations thereof.

32. The method according to claim 1:
wherein the second voltage corresponds to a predetermined temperature;
the method further comprising calibrating the heater in the magnetic recording head read sensor to determine the second voltage corresponding to the predetermined temperature,
wherein the calibrating the heater in the magnetic recording head read sensor comprises adjusting a voltage applied to the heater while measuring a temperature of the magnetic recording head.

\* \* \* \* \*